Dec. 22, 1959 J. R. MOONEY 2,918,116
TIRE TRUEING APPARATUS
Filed March 29, 1955 5 Sheets-Sheet 1

Inventor
JOHN RUSSELL MOONEY

Dec. 22, 1959     J. R. MOONEY     2,918,116

TIRE TRUEING APPARATUS

Filed March 29, 1955     5 Sheets-Sheet 4

INVENTOR
JOHN RUSSELL MOONEY

Dec. 22, 1959 J. R. MOONEY 2,918,116
TIRE TRUEING APPARATUS
Filed March 29, 1955 5 Sheets-Sheet 5

Inventor
JOHN RUSSELL MOONEY

United States Patent Office 2,918,116
Patented Dec. 22, 1959

2,918,116

TIRE TRUEING APPARATUS

John Russell Mooney, Aurora, Ill., assignor, by mesne assignments, to The Vendo Company, Kansas City, Mo., a corporation of Missouri Application March 29, 1955, Serial No. 497,614

10 Claims. (Cl. 157—13)

This invention relates to an apparatus for trueing out-of-round automotive tires so as to render them round and symmetrical.

It is well-known that automotive tires, even when new and before any use thereof, are frequently not perfectly round and symmetrical due to the nature of the manufacturing methods employed. Furthermore, tires which were originally symmetrical frequently become out-of-round while in use due to differential growth or swelling at a greater rate at some portions of the tire than at other portions. This differential swelling effect creates a problem that has become intensified in recent years with the increasing use of rayon and nylon fibers for the cord of the tire. In addition, other factors cause automotive tires to become out-of-round during use, such as severe bumps suffered by one spot on the tire, sliding of the tire along the ground during braking of the automobile, and mis-alignment of the front wheel suspension mechanism of the automobile. This non-symmetrical or out-of-round characteristic is highly dis-advantageous in that it results in vibration, bumping and generally poor riding qualities of the tire.

It is therefore a primary object of the present invention to provide an apparatus for trueing out-of-round automotive tires so as to render them round and symmetrical.

The apparatus of the present invention performs its trueing function by cutting the treaded periphery of the tire. The tire, together with its wheel, is rotatably mounted about an axis parallel to the axis of a rotary cutter. A novel arrangement is provided for engaging the tread of the tire to rotate the latter. The cutter is simultaneously rotated and the tire may be fed toward the cutter so as to regulate the depth of cut.

One of the important features of the invention resides in the drive means for rotating the tire. This comprises a rotating spindle engageable with the tire tread and mounted on a frame which is pivoted for swinging movement toward and away from the tire. A spring is provided to urge the frame toward the tire so as to maintain the drive spindle in frictional engagement with the tire tread as the latter is subjected to the action of the cutter.

Another object of the invention is to provide a novel safety arrangement for stopping the apparatus or maintaining it inoperative when a tire is not mounted in its proper position in front of the cutter. That is, when a tire is not mounted in the apparatus, the exposed cutter cannot rotate and cause injury if someone accidentally contacts the cutter. This is accomplished by providing a switch in the control circuit of the apparatus, the switch being actuated to shut off the motor when the spring has moved the drive spindle frame to its extreme position. This position is reached only in the absence of a tire against which the drive spindle may abut.

A further object of the invention is to provide a novel arrangement for collecting the rubber shavings, chips and dust which are cut from the tire tread by the cutter. This arrangement comprises a housing completely surrounding the cutter except for an opening through which the tire may project to engage the cutter. A vacuum fan is connected by a conduit to the bottom of the housing so as to carry off the rubber chips and dust collected therein. The chips and dust are then propelled by the fan to a collector bag.

Another important feature of the present invention resides in the novel arrangement for mounting the tire together with its wheel. A mounting plate is provided to which the wheel may be attached. This mounting plate is axially adjustable in a novel manner so as to adjust the position of the tire in the axial direction with respect to the cutter.

Still another object is to provide a novel arrangement whereby the axis of the tire may be angularly adjusted with respect to the axis of the cutter. This enables the apparatus to be set up so that the axis of the tire is parallel to the axis of the cutter notwithstanding wear of the parts of the apparatus or other factors which might cause improper alignment.

Another object of the present invention is to provide a novel arrangement for driving the various operative components of the apparatus whereby the cutter, the vacuum fan and the tire drive spindle may be drivingly rotated in an effective manner by means of a single motor with simple and efficient drive connections.

A further object is to provide a novel arrangement for driving the tire drive spindle, said arrangement including a variable speed transmission as part of the drive connection between said motor and the tire drive spindle, whereby the rotary speed of the tire may be varied as desired independently of the speed of the cutter and the vacuum fan.

Another object is to provide an apparatus of the character described having a novel gauge device for measuring the extent of non-symmetry or out-of-roundness of the tire mounted on the apparatus.

Still another object is to provide an out-of-round gauge device of the character described which is so constructed that when it is in use and in contact with the tire before the latter engages the cutter, the gauge device will be in an operative position to measure the extent of non-symmetry of the tire, but when the tire is moved into engagement with the cutter the gauge device automatically retracts to an inoperative position so as not to interfere with the tire during the actual cutting operation.

Still another object is to provide a novel cutter structure comprising an annular member having a concave exterior so as to be narrowest at its intermediate portion and tapering outwardly towards its outer ends, and a cutter blade wound somewhat helically in a groove around the exterior surface of said annular member and secured thereto. When the cutter is rotated about its axis it will generate the required concave cutting surface in conformity with the contour of the tire tread cross-section.

A further object of the present invention is to provide a tire trueing apparatus of the character described which will be economical to manufacture, and efficient and durable in use.

Other objects and advantages of the present invention are inherent in the structure as claimed and disclosed or will become apparent to those skilled in the art as the detailed description proceeds in connection with the accompanying drawings wherein:

Figures 1, 5, 6:
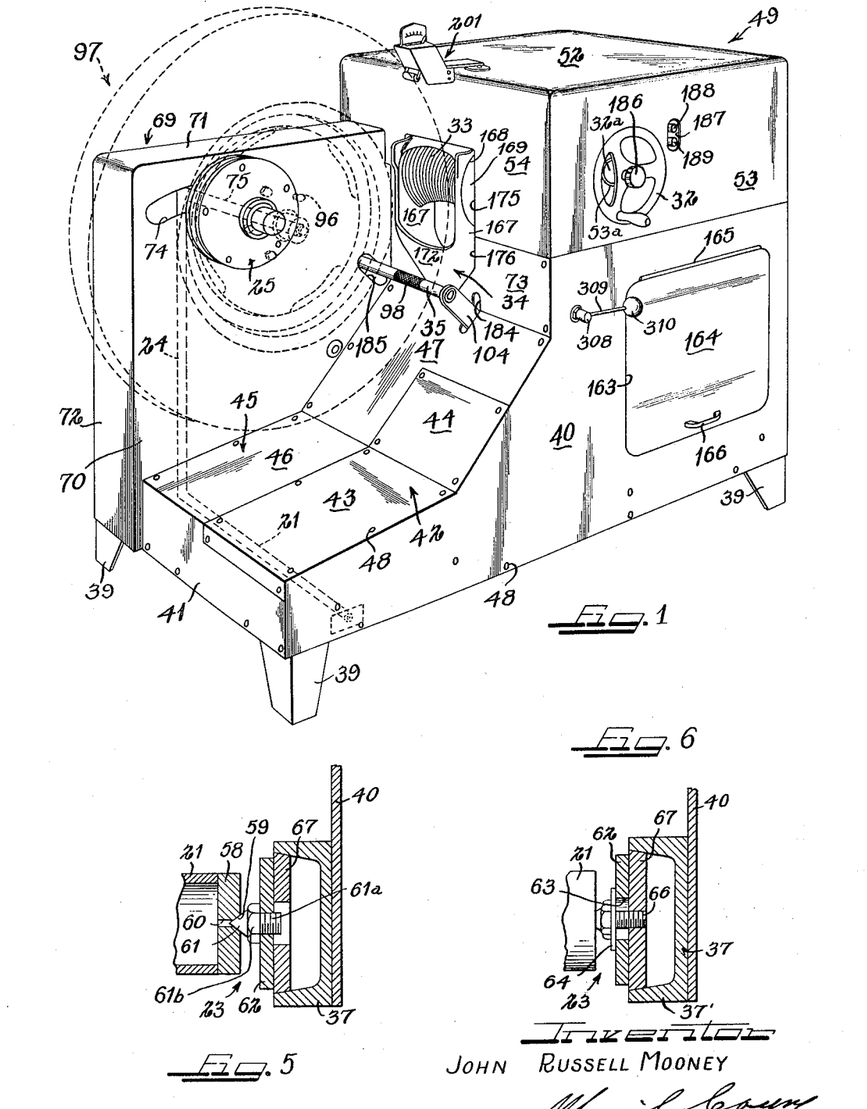
Fig. 1 is a perspective view of a preferred embodiment of the invention with a tire and wheel mounted thereon and shown in dotted lines.
Fig. 5 is a vertical sectional view taken on line 5—5 of Figure 3.
Fig. 6 is a vertical sectional view taken on line 6—6 of Figure 3.
Figures 2, 13:
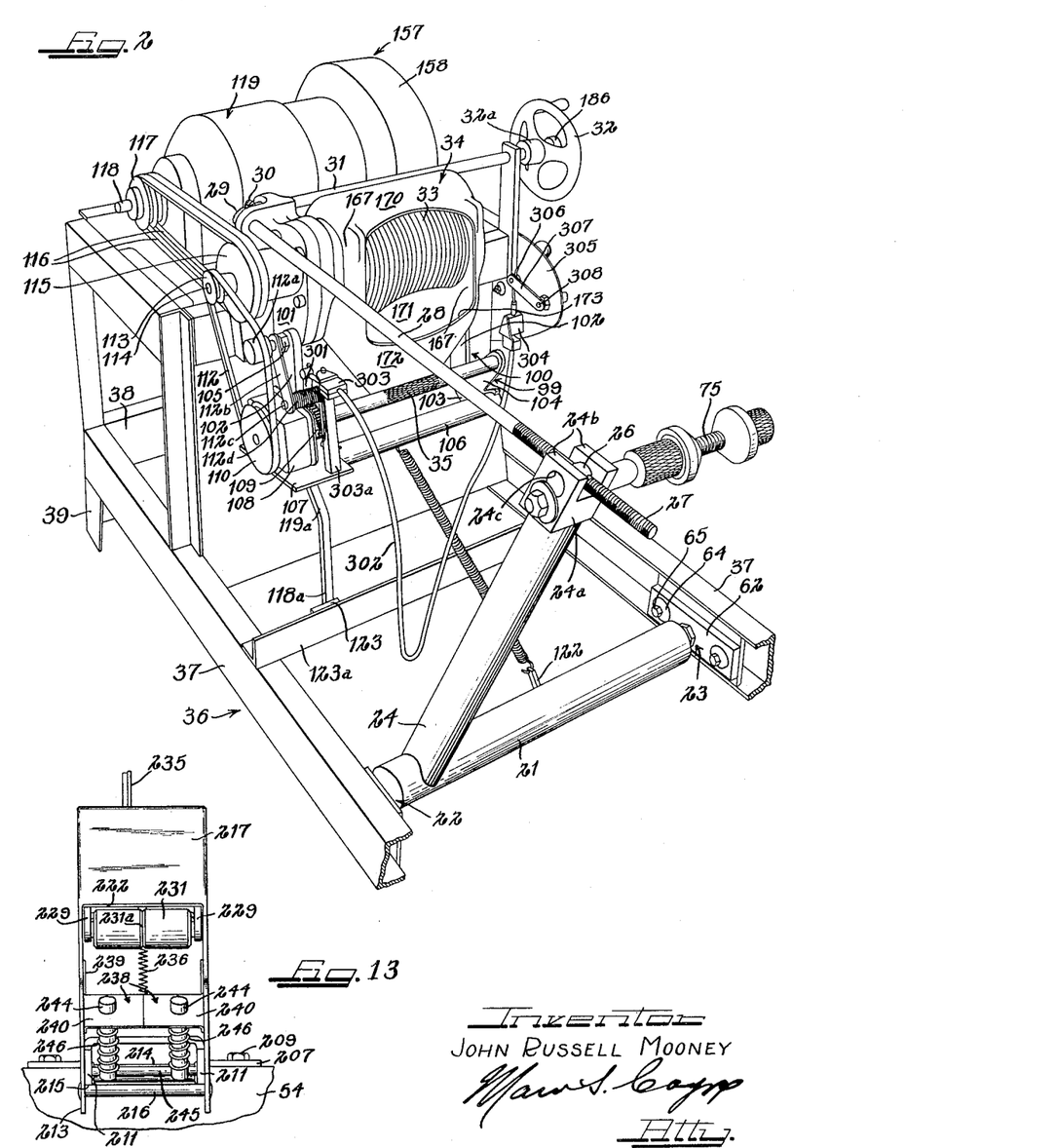
Fig. 2 is a perspective view showing merely the operative components of the apparatus with the casing removed and several of the parts broken away.
Fig. 13 is a front elevational view of the gauge device in the inoperative position of Fig. 12.

Referring now to the drawing in more detail, the general arrangement and mode of operation of the apparatus will first be briefly described. As best seen in Figs. 1 and 2, a horizontal shaft 21 is rotatably mounted at its opposite ends by means of bearings 22, 23. A vertical post 24 is provided with its lower end secured to shaft 21 adjacent the bearing 22. A wheel adapter or mounting plate 25 (Fig. 1) is freely rotatably mounted on a spindle 75 secured to the upper end of post 24 for rotation of plate 25 about a horizontal axis.

The upper end of post 24 is further provided with a internally threaded nut member 26 which receives the externally threaded portion 27 of a fed screw 28. The opposite end of the latter is provided with a bevel gear 29 in driving engagement with another bevel gear 30 which is in turn fixedly secured to a hand wheel shaft 31 having a conventional hand wheel 32 mounted thereon.

A cutter 33 is rotatably mounted within a housing 34, the axis of the cutter 33 extending parallel to the axis of rotation of mounting plate 25. A tire drive spindle 35 is rotatable about an axis parallel to the axes of cutter 33 and mounting plate 25. A vehicle wheel with a tire thereon may be secured to the mounting plate 25.

By rotating hand wheel 32, the distance between the axis of the mounted tire and the axis of the cutter 33 may be varied, the entire structure comprising shaft 21, post 24, spindle 75 and mounting plate 25 being oscillated about the axis of rotation of shaft 21 so as to bring the tread of the tire into engagement with the cutter 33. The tire drive spindle 35 will engage the tire tread and will be drivingly rotated by a suitable mechanism, to be described below, so as to cause the tire to rotate during the cutting action of cutter 33.

The upper end of vertical post 24 comprises a bifurcated member 24a having a pair of spaced parallel walls 24b each of which is formed with a circular bearing opening 24c extending therethrough. Nut member 26 is cylindrical in shape and is provided with opposite ends rotatably mounted within the bearing openings 24c, the axis of nut member 26 extending transversely of the axis of feed screw 28. Nut member 26 is provided with a threaded opening extending diametrically through an intermediate position thereof and the threaded end 27 of feed screw 28 extends through and is in engagement with this threaded opening. The nut member 26 is thus free to rotate about its axis as the relative angle between post 24 and feed screw 28 changes during the pivotal movement of post 24 about the axis of shaft 21.

Figure 3:
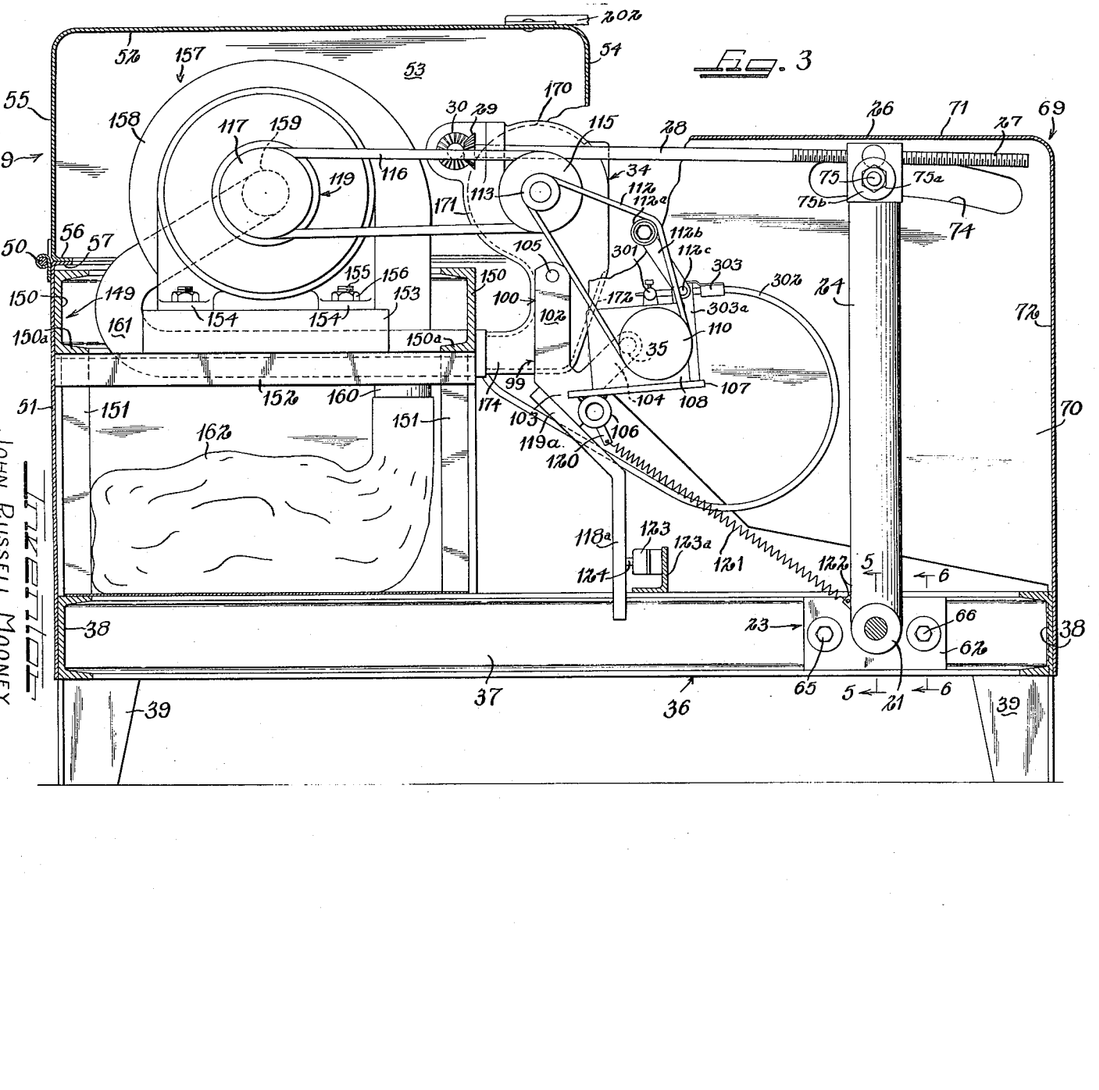
Fig. 3 is a vertical longitudinal sectional view through the apparatus.

Referring now to Figs. 1 to 3, the apparatus comprises a lower horizontal rectangular frame indicated generally by the reference numeral 36 and including a pair of spaced parallel longitudinal channel members 37 connected at their opposite ends by a pair of transverse channel members 38. At the four corners of rectangular frame 36 are downwardly depending legs 39 to support the apparatus on the ground. The operative components of the apparatus are substantially enclosed by a casing of approximately L-shaped configuration and including a pair of side panels 40 (Fig. 1), an end panel 41, a bent panel 42 consisting of sections 43 and 44, and another bent panel 45 consisting of sections 46 and 47. The various panels are secured in assembled relation by screws indicated at 48 or any other suitable means.

A cover indicated generally by the reference numeral 49 is hingedly mounted at its lower edge by hinge means 50 (Fig. 3) to the upper edge of a rear panel 51. The cover 49 comprises a horizontal top wall 52, side walls 53, a forward end wall 54, and a rear end wall 55.

The lower edge of rear end wall 55 is provided with a horizontal inwardly extending flange 56 which is adapted to rest upon a horizontal flange 57 formed on the upper edge of the rear panel 51 when the cover 49 is in the closed position as shown. The cover 49 may be swung upwardly and rearwardly about the hinge 50 so as to expose the mechanism enclosed within the casing for inspection and repair.

Referring now to Figs. 3, 5, and 6, the shaft 21 referred to above is in the form of a hollow cylindrical tube having each of its opposite ends closed by a member 58 secured thereto. Each member 58 forms a part of bearings 22, 23 and is formed with a conical recess 59 coaxial with the shaft 21. The inner end of conical recess 59 communicates with a cylindrical bore 60 extending to the interior of the shaft 21. A conical center element 61 extends within the recess 59 and is provided with a threaded shank 61a fixedly secured within a threaded aperture in a rectangular plate 62. A lock nut 61b holds shank 61a in secure position. The plate 62 is provided with a pair of holes 63 through which extend the shanks of a pair of screws 65, 66 in threaded engagement within suitable openings provided in a plate 67 which is fixedly secured by welding to the horizontal flanges 37' of the respective longitudinal channel beam 37.

A washer 64 is mounted between the head of each of the screws 65, 66 and the adjacent surface of the plate 62. As best seen in Fig. 6, the holes 63 are considerably larger than the threaded shanks of the screws 65, 66. This enables plates 62 to be adjustably moved either vertically or laterally to any desired position so as to permit the axis of the shaft 21 to be adjusted and made parallel to the axis of cutter 33. Tightening of the screws 65, 66 causes the washers 64 to frictionally engage the surfaces of plates 62 and thereby hold plates 62 securely in their adjusted positions.

It will thus be seen that the shaft 21 is rotatably mounted at its opposite ends on the conical center elements 61. Furthermore, the opposite ends of shaft 21 are adjustable both horizontally and vertically so as to enable the axis of shaft 21 to be aligned parallel to the axis of cutter 33. That is, screws 65, 66 of bearing 23 may be loosened to enable either or both of plates 62 to be moved to any extent permitted by the size of the holes 63 in relation to the shanks of screws 65, 66 which may then be tightened to maintain the plates 62 in fixed adjusted relation with respect to the plates 67.

The bearing 22 at the opposite end of shaft 21 is similar to the bearing 23 shown in Figs. 5 and 6 except that, if so desired, the plate 62 of the bearing 22 may be fixedly secured to the respective longitudinal channel member 37 without the necessity of providing the adjustable arrangement described, since movement of only one end of shaft 21 is usually sufficient to adjust the axis of shaft 21 parallel to the axis of the cutter 33.

As best seen in Fig. 1, a narrow vertical auxiliary casing indicated generally at 69 is provided to enclose the vertical post 24. The auxiliary casing 69 comprises a pair of vertical side walls 70 joined by a top horizontal wall 71 and a vertical end wall 72. Those edges of the inner side wall 70 and top wall 71 which are opposite end wall 72 abut against wall 54 of cover 49 and against a vertical panel 73 which extends downwardly from the lower edge of wall 54 to the upper edge of panel section 47. As shown in Figures 1 and 3, the inner side wall 70 is provided with an arcuate slot 74 having a center of curvature coincident with the axis of rotation of shaft 21, for a purpose to be described.

Figure 4:
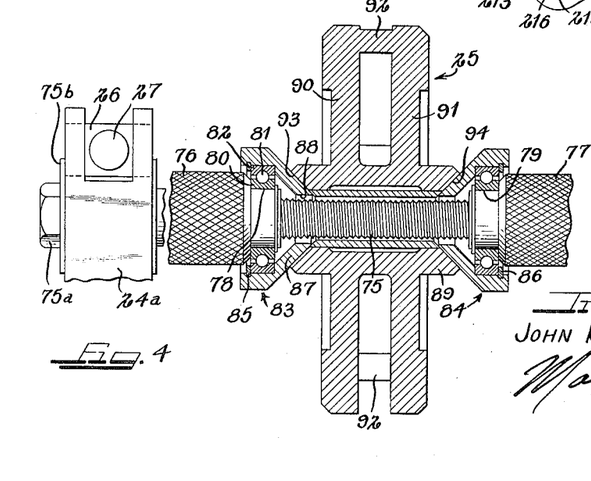
Fig. 4 is a sectional view taken through the axis of the spindle and the wheel adapter or mounting plate.
Figure 7:
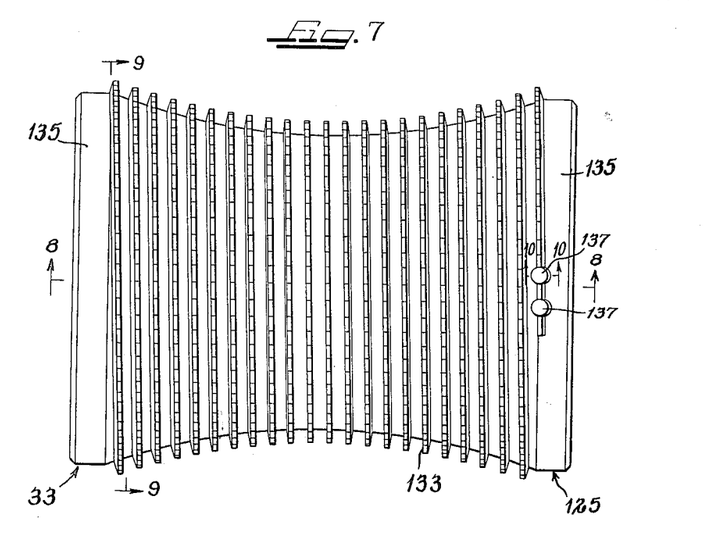
Fig. 7 is a side elevational view of the cutter.

Referring now to Fig. 4, the spindle 75 is externally threaded and is secured at one end to the upper end of vertical post 24 by means of a nut 75a and washer 75b. Spindle 75 projects horizontally through slot 74 of side wall 70 outwardly of the auxiliary casing 69. A pair of internally threaded nuts 76, 77 are mounted on the outer end of spindle 75 in threaded engagement therewith. The adjacent ends of each of the nuts 76, 77 is provided with a ball bearing indicated generally at 78, 79 respectively.

Each of the ball bearings 78, 79 comprises an inner race member 80 mounted on a reduced end portion of the respective nut 76 or 77, a series of balls 81, and an outer race member 82 rotatable with respect to the inner race member 80. A pair of cone members 83, 84 are mounted on each of the outer race members 82 respectively and are retained in position thereon by means of retaining rings 85, 86. The cone members 83, 84 are each provided with a conical portion 87 and are preferably hollow in construction. The inner end of each of the cone members 83, 84 is provided with a clearance opening 88 of a larger diameter than the threaded spindle 75 so as to enable the latter to pass freely therethrough.

The wheel mounting plate or adapter is indicated generally by the reference numeral 25 in Fig. 4 and comprises a hollow cylindrical hub 89 on which is mounted a pair of axially spaced parallel circular plate elements 90, 91 joined at several locations around their outer peripheries by interconnecting web portions 92. The opposite open ends of hub 89 are provided with tapered conical surfaces as at 93, 94 to engage the conical portions 87 of the cone members 83, 84. It will thus be seen that mounting plate 25 together with cone members 83, 84 and the outer race members 82 of ball bearings 78, 79 are freely rotatable as a unit about the axis of threaded spindle 75. Furthermore, mounting plate 25 is axially adjustable to the left or to the right, as viewed in Fig. 4, in the following manner. The exterior surfaces of nuts 76, 77 are preferably knurled so as to be easily rotated on the threaded spindle 75. Rotation of of the nuts 76, 77 causes the latter to be moved axially along the spindle 75 so as to move therewith the entire structure comprising bearings 78, 79, cone members 83, 84 and mounting plate 25.

As best seen in Fig. 1, the circular plate elements 90, 91 of mounting plate 25 are provided with a series of openings adapted to receive suitable bolts as at 96. The hub of a conventional automotive wheel with a tire 97 thereon may thus be quickly and easily mounted to or removed from the mounting plate 25.

Referring now to Figs. 1 to 3 inclusive, the tire drive spindle 35 is knurled at the intermediate portion 98 thereof so as to frictionally engage the treaded peripheral surface of the tire 97. The spindle 35 is rotatably mounted in a frame indicated generally at 99 and comprising a pair of horizontally spaced support members 100 each having a vertical leg 102, a downwardly and forwardly inclined leg 103, and an upwardly and forwardly inclined leg 104. The opposite ends of the drive spindle 35 are rotatably mounted in the upper ends of the legs 104. The upper ends of the legs 102 are pivotally mounted at 105 to the opposite lateral sides of the cutter housing 34, the left-hand leg 102 (as viewed in Fig. 2) being pivotally mounted to a bracket 101 fixed to one side of the cutter housing 34 and the right-hand leg 102 being pivotally mounted directly to the other side of housing 34. A horizontal tubular brace 106 is fixedly secured to and extends between the lower ends of the legs 103.

Secured to the left-hand support member 100 and extending laterally outwardly therefrom is a support plate 107. Mounted on the latter is a variable speed transmission device 108 of conventional construction. A gear 109 is secured to the left-hand end of tire drive spindle 35 and is in driving engagement with a pinion (not shown) on the usual output shaft (not shown) of the transmission device 108. A pulley 110 is fixed to the input shaft 111 of the transmission device 108 and is engaged by a belt 112 which also extends around a pulley 113 secured to a shaft 114 which is drivingly connected to, or may be integral with, the shaft on which the cutter 33 is mounted.

Also secured to shaft 114 is a larger pulley 115 having two grooves receiving a pair of parallel belts 116 which engage a pulley 117 secured on the output drive shaft 118 of an electric motor indicated generally by the reference numeral 119. It will thus be seen that actuation of the electric motor 119 will cause rotation of the cutter 33 through the drive connection comprising shaft 118, pulley 117, belts 116, pulley 115 and shaft 114. Rotation of the shaft 114 driven by the electric motor 119 will also cause rotation of the tire drive spindle 35 through the driving connection comprising pulley 113, belt 112, pulley 110, shaft 111, variable speed transmission device 108, the output shaft and pinion of the latter, and gear 109 in engagement with said pinion.

As best seen in Figs. 2 and 3, the upper run of belt 112 is engaged by a roller 112a rotatably mounted on the upper end of a lever 112b. The latter is pivotally mounted at its lower end on a pivot pin 112c attached to the upper end of a vertical element 303a having its lower end fixedly secured to the plate 107. A coil spring 112d extends around the pin 112c and resiliently urges the lever 112b in a clockwise direction as viewed in Fig. 3 so as to urge the roller 112a against the belt 112. The latter is thus maintained in proper tension for all positions of the swinging frame 99 about its pivotal axis 105.

The gear ratio of transmission device 108, that is the ratio of the speeds of the input and output shafts, is controlled in the conventional manner by a lever 301 which is actuated by a flexible cable enclosed within the usual flexible sheath 302. One end of the sheath 302 is anchored to a bracket 303 secured to the upper end of the vertical element 303a secured on plate 107. The opposite end of the sheath 302 is fixed to a bracket 304 mounted on a plate 305 fixed to the frame of the apparatus. One end of the flexible cable is secured to the upper end of lever 301 and the opposite end 306 of the cable is secured to one end of a lever 307. The other end of lever 307 is fixed to a pin 308 which is rotatably mounted in the plate 305.

As best seen in Fig. 1, a lever 309 is secured to the outer projecting end of pin 308 and is provided with a hand knob 310. The operator may thus actuate lever 309 so as to rotate lever 307 about the axis of pin 308 and thereby move the flexible cable within the sheath 302 to actuate the lever 301 and thereby adjust the gear ratio of the variable speed transmission device 108. This arrangement permits the speed of rotation of the tire drive spindle 35 to be selectably varied independently of the speed of electric motor 119, cutter 33 and the fan device to be described below.

A vertical detent 118a is provided at its upper end with an inclined portion 119a (Fig. 3) secured to the downwardly extending leg 103 of the left-hand support member 100. Brace 106 is provided with a lug 120 to which is secured one end of a tension spring 121 having its opposite end secured to a lug 122 fixed to shaft 21 at an intermediate portion of the latter. A switch 123 is mounted on a horizontally extending angle member 123a and is provided with an actuating button 124 adapted to be engaged by the vertical detent 118a when the spring 121 pulls the entire frame 99 forwardly about the axis of its pivotal mounting 105 on the cutter housing 34. When a tire is not mounted in the apparatus, the frame 99 will be free to be pivoted forwardly to its extreme position by spring 121 so as to cause detent 118a to actuate switch 123 and thereby open the energizing circuit of motor 117 to maintain the apparatus inoperative. That is, unless a tire is mounted in the apparatus so as to cover the exposed portion of cutter 33, the cutter 33 will not be rotated, thereby preventing personal injury due to accidental contact with the exposed cutter 33.

When a tire 97 is properly mounted in the apparatus with its wheel secured to the mounting plate 25 in the manner shown in Fig. 1, the frame 99 will be urged forwardly by the spring 121 so as to bring the tire drive spindle 35 into frictional engagement with the treaded peripheral surface of the tire 97.

The cutter may be of any suitable type, such as the conventional grinding wheel usually employed with conventional apparatuses for grinding off the tire tread in preparation for recapping. However, it has been found that the cutter 33 as disclosed in Figs. 7 to 10 inclusive is particularly advantageous in conjunction with the present apparatus. As disclosed in said figures, cutter 33 comprises a hollow annular shell member 125 having an approximately hyperbolic exterior contour in axial cross-section as viewed in Fig. 8. That is, the exterior surface of shell member 125 tapers inwardly from its opposite outer ends so as to be of smaller diameter in its intermediate portion than at said ends and to generate a somewhat concave shape in conformity with the convex contour of the treaded peripheral surface of the tire. The interior of shell 125 is provided with an integral hub 126 having an axial opening 127 therethrough for receiving the reduced portion 126a of the cutter shaft 126b.

The shaft 126b extends through a hollow cylindrical sleeve 128 which is fixedly mounted within the interior of the cutter housing 34. A ball bearing 129 is mounted in the end of sleeve 128 and provides a rotatable bearing means for the reduced portion 126a of cutter shaft 126b. Bearing 129 engages both the shoulder 126c of shaft 126b and the end face 127a of the hub 126, thereby permitting bearing 129 to take up the axial thrust on the cutter 33. The hub 126 is fixed to the shell 125 by a series of radially extending ribs 130 best seen in Fig. 9. Hub 126 is maintained axially fixed on shaft 112 and in abutment with bearing 129 by means of a nut 131 on an externally threaded end of the reduced shaft portion 126a.

Figure 8:
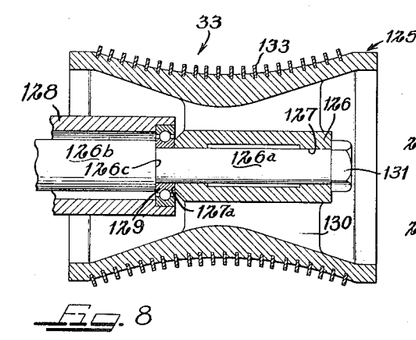
Fig. 8 is a sectional view through the axis of the cutter and is taken on line 8—8 of Figure 7.

Extending helically around the exterior surface of the shell 125 is a continuous integral cutter blade 133. As shown in Fig. 8, the exterior surface of shell 125 is provided with a continuous helical groove receiving cutter blade 133. Blade 133 is relatively narrow in width and its exterior periphery is provided with a series of teeth 134. Cutter blade 133 and the helical groove extend normal to he concave exterior surface of shell 125 and radial with respect to the center of curvature of said concave surface.

Figures 9, 10:
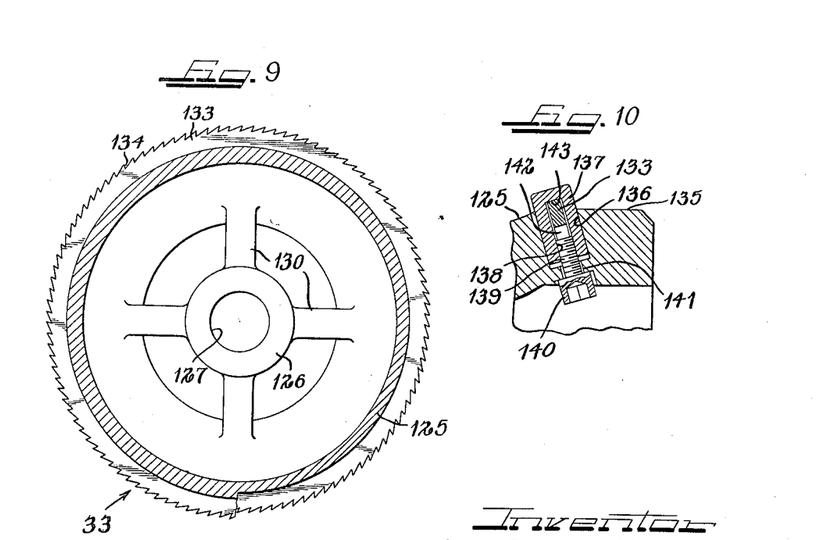
Fig. 9 is a sectional view taken on line 9—9 of Figure 7.
Fig. 10 is a sectional view taken on line 10—10 of Figure 7 and shows the means for securing the cutter blade to the annular member around which it extends.

The opposite ends of blade 133 are secured to the shell 125 in the manner shown in Fig. 10. Each of the extreme opposite ends of shell 125 is provided with a non-tapered cylindrical surface as at 135. At the juncture of each of the surfaces 135 with the tapered portion of shell 125 are a pair of radially extending cylindrical recesses 136 in each of which is slidably mounted a cylindrical blade retainer element 137. The latter is provided with an internally threaded opening 138 extending radially outwardly from its inner end and adapted to receive the threaded shaft 139 of a socket screw 140. The latter projects radially outwardly through an opening 141 which communicates between the hollow interior of shell 125 and the cylindrical recess 136.

Each retainer element 137 is further provided with a rectangular opening or slot 142 extending transversely therethrough and to the lower end thereof in order to receive a respective one of the extreme end portions of cutter blade 133. It will thus be seen that each socket screw 140 may be rotated to draw its respective retainer element 137 radially inwardly within recess 136 so as to cause the upper surface 143 of the rectangular opening 142 to engage the blade 133 and thereby urge the latter radially inwardly in frictional engagement with the bottom of the helical groove in which blade 133 is received. The opposite ends of the blade 133 are thus retained in secure relation to the shell 125. It will be obvious that the blade 133 may be quickly and easily removed from shell 125 for replacement or repair by merely unscrewing the four socket screws 140 at opposite ends of shell 125 so as to permit loosening or removal of the four retaining elements 137 and thereby freeing the opposite ends of the cutter blade 133.

Referring to Fig. 3, an upper rectangular frame 149 comprising four channel members 150 is supported on the lower rectangular frame 37 by a series of vertical column elements 151. A pair of beams 152 extend across the upper frame longitudinally of the apparatus and are secured at their opposite ends to the lower flanges 150a of the transverse pair of channel members 150. A mounting plate 153 is secured on the beams 152 within the interior of the upper frame 149. The electric motor 119 is provided with mounting lugs 154 which are secured to the mounting plate 153 by conventional studs 155 and nuts 156.

As best seen in Fig. 2 and described in detail above, the output shaft 118 projecting from one end of the motor 119 is connected by the pulley 117 and the other elements of the drive connection to the cutter 33 and tire drive spindle 35. The opposite end of the motor 119 has mounted thereon a vacuum or suction device indicated generally by the reference numeral 157 and comprising a housing 158 having an inlet 159 (Fig. 3) and a discharge duct 160. The inlet 159 is connected by a conduit 161 to the cutter housing 34. The drive shaft of the motor 119 is drivingly connected to a conventional centrifugal fan (not shown) rotatably mounted within the housing 158. The discharge duct 160 of housing 158 projects downwardly and is connected to a collector bag 162 located within the apparatus casing.

As shown in Fig. 1, the side wall 40 of the apparatus casing is provided with a rectangular opening 163 normally closed by a door 164 hinged at its upper edge at 165 so as to be opened by grasping the handle 166. When the door 164 is opened, access is provided to the collector bag 162 so as to enable the latter to be removed from the lower discharge end of the duct 160 for emptying the material collected within the bag 162. It will thus be seen that the rubber chips and shavings ground or cut off the peripheral treaded surface of tire 97 are trapped within the cutter housing 34 and then fall to the bottom thereof so as to be drawn through conduit 161 by the vacuum device 157. The rubber chips and shavings are then discharged from fan housing 158 through the duct 160 into the receptacle or bag 162 where they are retained and collected for disposal at periodic intervals. This arrangement prevents the rubber chips, shavings and dust from being thrown about and thereby eliminates the dangerous hazard of flying chips and also obviates the necessity for cleaning the apparatus and the surrounding floor area of the chips and dust.

Referring now to Fig. 2, the cutter housing 34 comprises a pair of side walls 167 joined to an arcuate top wall 170, a rear wall 171 and a front wall 172. The latter is provided with an enlarged approximately rectangular opening 173 through which the tire 97 may project into the interior of housing 34 so as to engage cutter 33. As seen in Fig. 1, one of the side walls 167 is provided with a circular opening 168 normally closed by a plate 169 which is removable to enable cutter 33 to be inserted into or withdrawn from housing 34 through opening 168.

As best shown in Fig. 3, the top wall 170 and rear wall 171 are of segmentally cylindrical configuration. The lower end of housing 34 tapers downwardly and leads into a rearwardly extending cylindrical discharge duct portion 174 which is connected to the forward end of the conduit 161. Referring to Fig. 1, the wall 54 of casing cover 49 is cut out at 175 and the panel 73 is cut out at 176 so as to provide an opening through which the forward portion of cutter housing 34 may project outwardly through the wall 54 and the panel 73 toward the axis of tire 97.

Referring again to Fig. 1, panel 73 and panel section 47 are cut away to provide a slot 184 through which one of the legs 104 of frame 99 extends upwardly and outwardly. The inner wall 70 of the auxiliary housing 69 is provided with an inclined slot 185 through which the tire drive spindle 35 extends. The slot 185 is inclined at an angle so as to provide clearance for drive spindle 35 for all the positions it may assume during swinging movement of the frame 99 about the pivotal mounting means 105.

The hand wheel shaft 31 stops short interiorly of the side wall 53 of casing cover 49. The hand wheel 32 is provided with a cylindrical hub 32a which projects inwardly through an opening 53a formed in the side wall 53 of casing cover 49. A knob 186 is provided with a shaft (not shown) extending through an axial opening in the hub 32a. The innermost end of this shaft is in threaded engagement within a threaded opening (not shown) formed in the end of shaft 31. The knob 186 and its shaft thus serve to secure hand wheel 32 and hub 32a to the shaft 31. When the casing cover 49 is to be raised to the open position, the knob 186 is manually rotated so as to remove its threaded shaft from shaft 31 and thereby permit removal of the hand wheel 32 with its hub 32a. The casing cover 49 is then free to be moved upwardly without interference of the hub 32a which normally extends through the side wall 53.

Wall 53 is provided with an opening 187 therein to provide access to a pair of push buttons 188, 189. The latter may be manually depressed to start and stop the operation of the apparatus in the conventional manner, it being understood that actuating the "start" push button will not start up the apparatus if a tire is not mounted thereon so as to maintain detent 118a out of engagement with safety switch 123 which is connected in series with the energizing circuit (not shown) of electric motor 119.

Figure 11:
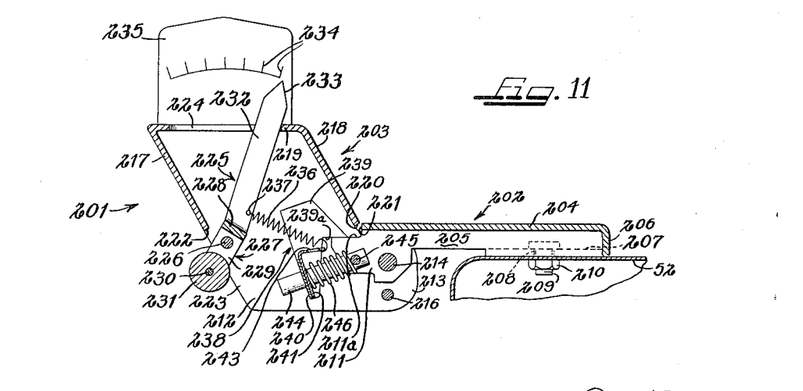
Fig. 11 is a vertical sectional view of the out-of-round gauge device showing the latter in its operative position.
Figure 12:
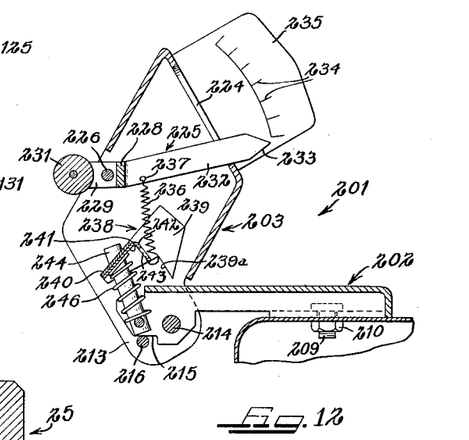
Fig. 12 is a sectional view similar to Fig. 11 but showing the gauge device in its retracted inoperative position.

As shown in Fig. 1, an out-of-round gauge indicated generally by the reference numeral 201 is mounted on the top wall 52 of the casing cover 49 in order to measure the extent to which an automotive tire is not perfectly round and symmetrical. Referring to Figs. 11, 12 and 13, the gauge 201 comprises a bracket 202 to which is hinged a housing 203. Bracket 202 is of substantially channel shape in cross-section and comprises a top wall 204, a pair of vertical side walls 205, and a rear wall 206.

A pair of flanges 207 are integral with and extend horizontally outwardly from the lower edges of the rear portions of side walls 205. Flanges 207 rest upon the upper surface of the top wall 52 of casing cover 49. Each of the flanges 207 is provided with a hole 208 receiving the shank of a bolt 209 which extends through a suitable aperture formed in top wall 52. A nut 210 is threaded on the bolt 209 so as to maintain bracket 202 securely fastened to top wall 52.

Each of the side walls 205 of bracket 202 is provided at its forward end with a downwardly extending ear 211 in the same vertical plane as the side wall 205.

Gauge housing 203 comprises a pair of side walls 212 of approximately parallelogram shape and each having a rearwardly extending ear 213. The ears 211 of bracket 202 extend between the ears 213 of housing 203, each of the ears 211 being located inwardly of and adjacent to a respective one of the ears 213. A pivot pin 214 extends horizontally through suitable aligned apertures formed in both pairs of ears 211, 213 so as to enable housing 203 to be pivotally mounted to bracket 202 for swinging movement from the horizontal position of housing 203 shown in Fig. 11, to its upper inoperative position shown in Figs. 12 and 13.

The lower edges of ears 211 are recessed so as to provide abutment shoulders indicated at 215. A pin 216 is mounted in the ears 213 and extends horizontally thereacross. As shown in Fig. 12, pin 216 is adapted to engage the shoulders 215 so as to limit the upward movement of housing 203.

Housing 203 further comprises a rearwardly and downwardly extending front wall 217, a rear wall 218 extending parallel to front wall 217, and a top horizontal wall 219. The lower edge 220 of rear wall 218 is located slightly forwardly of and above the forward edge 221 of bracket top wall 202 so as to provide the necessary clearance to enable housing 203 to swing upwardly toward its inoperative position. The lower edge 222 of housing front wall 217 is located at an intermediate height to provide an opening 223 at the lower front portion of housing 203. Top wall 219 is provided with a longitudinal slot 224 extending almost entirely thereacross.

An indicator member 225 is located within housing 203 and is pivotally mounted to side walls 212 by means of a pivot pin 226. The lower portion of indicator member 225 comprises a U-shaped frame 227 including a horizontal element 228 joined at its opposite ends to the upper portions of a pair of forwardly downwardly extending spaced parallel elements 229. The latter are provided with suitable aligned apertures receiving said pivot pin 226 whereby the entire indicator member 225 is pivotally mounted about the axis of pin 226. Another pin 230 is mounted in the lower forward ends of elements 229 and extends therebetween. A tire engaging follower roller 231 is rotatably mounted on pin 230 and extends horizontally between the elements 229.

Secured to the upper surface of horizontal element 228 is a pointer 232 which extends upwardly through the slot 224 in top wall 219. The upper end of pointer 232 is provided with a pointed end 233 which cooperates with the scale indicia or markings 234 inscribed on a vertical scale plate 235 mounted on the top wall 219. A tension spring 236 is attached at one end within an opening 237 formed in the lower portion of pointer 232 and resiliently urges the entire indicator member 225 in a clockwise direction, as viewed in Figs. 11 and 12, about the axis of pivot pin 226.

It will thus be seen that an automotive tire 97 may be mounted on the spindle 75 and then brought into engagement with the roller 231 by manually rotating the hand wheel 32. The tire 97 may then be turned by hand or by means of the drive spindle 35 and the spring 236 will maintain roller 231 in contact with the treaded surface of tire 97. As roller 231 follows the contour of tire 97 during rotation of the latter, indicator member 225 will move about the axis of pivot pin 226, and the extent to which tire 97 is out-of-round will be indicated by the pointer 232 in cooperation with the scale 234. The latter is provided with suitable indicia markings so that the extent to which the tire is non-symmetrical, preferably in units of inches out-of-round, may be read directly on the scale 234.

The above described operation of gauge 201 occurs when housing 203 is in its lower operative position shown in Fig. 11. During the actual cutting operation when tire 97 is in engagement with cutter 33, gauge housing 203 is retracted in the upper inoperative position shown in Figs. 12 and 13, in a manner now to be described. A pair of brackets indicated generally by the reference numeral 238 are each formed with a flange 239 secured to the interior wall surface of a respective one of side walls 212. Each bracket 238 further comprises an inwardly extending portion 240, both portions 240 having inner ends in abutting or adjacent relation. A spring anchor member 241 is fixedly secured to portions 240 and is provided with a horizontally extending flange 242 having an aperture 243 within which the other end of said spring 236 is secured.

Each portion 240 is formed with a clearance opening through which extends a respective one of a pair of pins 244. The rearward ends of pins 244 are rotatably mounted on a pivot pin 245 having its opposite ends mounted within suitable apertures formed in the ears 211 of bracket 202. A compression coil spring 246 extends around each of the pins 244, one end of each spring 246 pressing against a respective one of bracket portions 240 and the opposite end of each spring 246 pressing against the pin 245.

It will thus be seen that pin 214, pin 245 and bracket portions 240 constitute the three points of a toggle arrangement. That is, springs 246 are in compression and when housing 203 is in its lower operative position shown in Fig. 11, springs 246 press against bracket portions 240 so as to urge housing 203 in a counterclockwise direction about the axis of pin 214 to maintain housing 203 in said operative position. However, as housing 203 is forcibly pivoted upwardly about the axis of pin 214 against the force of springs 246, a dead-center position is eventually reached wherein pins 214 and 245 are in alignment with the axes of springs 246. After continued upward movement of housing 203 past this dead-center position, the force of springs 246 will act to urge housing 203 in a clockwise direction about the axis of pin 214.

Therefore, after housing 203 passes this dead-center position, the action of springs 246 will cause housing 203 to be snapped upwardly until the completely retracted position is reached as shown in Fig. 12 wherein pin 216 engages the abutment shoulders 215. Housing 203 will be maintained in this retracted inoperative position until housing 203 is manually grasped by the operator and moved downwardly past the dead-center position, whereupon springs 246 will then act to snap housing 203 all the way down to the operative position shown in Fig. 11. Flanges 239 are provided with abutment shoulders 239a which engage the upper edges 211a of bracket ears 211 to limit the downward movement of housing 203 and to maintain the latter in its operative position against the action of springs 246 which urge housing 203 in a counter-clockwise direction.

After gauge device 201 has been employed to measure the extent of non-symmetry or out-of-roundness of tire 97 and it is desired to commence or resume the cutting operation, hand wheel 32 is manually operated to move spindle 75 toward cutter 33. During this inward movement, tire 97 will pass against roller 231 until the entire housing 203 starts to pivot upwardly about the axis of pivot pin 214. Housing 203 then continues to pivot upwardly as the tire presses against roller 231 until after the dead-center position of housing 203 is reached, whereupon springs 246 will then immediately snap the housing 203 into the upper retracted position in the manner described above. Housing 203 and its roller 231 will then be completely out of contact with and suitably spaced from tire 97, and further manipulation of hand wheel 32 will bring tire 97 into engagement with cutter 33 for the cutting operation during which gauge 201 remains in its retracted position.

The operation of the apparatus will now be briefly described. A tire 97 which is out-of-round so as to have flat spots and other defects of symmetry on its peripheral tread surface is removed from the vehicle together with the wheel on which the tire is mounted. The wheel and tire assembly is then mounted on the wheel adapter or mounting plate 25 and is secured in position thereon by bolts 96 passing through apertures in the wheel and also the apertures in the mounting plate 25. The axial position of the tire 97 is then adjusted so that the center line of tire 97 is in alignment with the center of cutter 33. This adjustment is made by rotating nuts 76, 77 in the proper direction so as to move the mounting plate 25 axially along spindle 75 until the tire center-line coincides with roller notch 231a.

The hand wheel 32 is then rotated to bring the periphery of tire 97 into engagement with the cutter 33. Rotation of hand wheel 32 causes rotation of the feed screw shaft 28 through bevel gears 29, 30. When the feed screw shaft 28 rotates, the nut member 26 on the upper end of post 24 is moved axially with respect to shaft 28 so as to pivot post 24 and mounting plate 25 together with shaft 21 about the axis of rotation of the latter.

When the tire 97 is mounted in the apparatus, its peripheral tread will engage the tire drive spindle 35 so as to pivot frame 99 clockwise as shown in Figure 3 and against the tension of spring 121. This causes detent 118a to move out of engagement with safety switch 123 so as to permit the apparatus to commence operation upon manual depression of the "start" push button 188. Motor 117 is energized to drivingly rotate the tire drive spindle 35, the cutter 33, and the centrifugal fan within the housing 158 of the vacuum device 157. Rotation of the drive spindle 35 in engagement with the tire tread will cause tire 97 to rotate about the axis of spindle 75 so that the entire tire periphery will be subjected to the cutting action of the cutter 33 as the latter rotates.

After the entire periphery is thus subjected to a cutting action of a predetermined depth, it may be desirable to impart a second cut to tire 97 at a greater depth. This is easily accomplished by rotating the hand wheel 32 to bring the axis of tire 97 still closer to the axis of cutter 33. Successive cuts at increasingly greater depths may be taken in this manner until the peripheral surface of tire 97 is perfectly round and all flat spots and other defects of symmetry have been eliminated.

It is to be understood that the specific embodiment shown in the drawing and described in detail above is merely illustrative of one of the many forms which the invention may take in practice without departing from the scope thereof as delineated in the appended claims, and the claims are to be construed as broadly as possible in view of the prior art without being unduly limited by the disclosure.

I claim as new and desire to secure by Letters Patent:

1. A tire trueing apparatus comprising means for mounting a tire for free rotation about an axis, gauge means for measuring the extent of non-symmetry of the tire, a cutter mounted for rotation about an axis parallel to the axis of the tire mounting means, driving means for said cutter, adjustable means for moving the tire mounting means so as to bring the treaded peripheral surface of the tire into engagement with the gauge means for measuring the extent of non-symmetry of the tire, means engageable with the tire for rotating the tire about its axis of rotation, said tire mounting adjustable means being operable to render the gauge means ineffective and carry the peripheral treaded surface of the tire into engagement with the cutter for cutting a desired predetermined depth of material from said surface.

2. A tire trueing apparatus as recited in claim 1 wherein said gauge means comprises follower means engageable with said treaded surface of the tire, said follower means being movably mounted for alternative movement to either an operative position in engagement with said tire treaded surface or to a retracted inoperative position out of engagement with the tire.

3. A tire trueing apparatus as recited in claim 2 wherein said gauge means comprises spring-actuated means for maintaining said follower means in either selected one of said positions.

4. A tire trueing apparatus as recited in claim 3 wherein said spring-actuated means comprises a toggle mechanism.

5. A tire trueing apparatus as recited in claim 1 wherein said gauge means comprises a fixed bracket, a member movably mounted to said bracket for movement either to an operative position or to a retracted position, a follower element movably mounted to said member and adapted to engage the peripheral treaded surface of the tire when said member is in said operative position and being out of engagement with said tire when said member is in said retracted position, said follower element being movable in response to pressure thereon by said tire as the latter is rotated, and indicator means responsive to movement of said follower element for indicating the extent of non-symmetry of the tire as the latter is rotated in contact with said follower element.

6. A tire trueing apparatus as recited in claim 5 wherein said gauge device comprises spring-actuated toggle means for maintaining said member selectably in either said operative position or said retracted position.

7. A tire trueing apparatus comprising a cutter, means rotatably mounting the cutter, drive means for rotating the cutter, means for mounting a tire for free rotation about an axis parallel to the axis of rotation of said cutter, adjustable means for varying the distance between said tire mounting means and said cutter so as to bring the treaded periphery of the tire into engagement with the cutter for cutting a desired predetermined depth of material from the tire periphery, a drive spindle engageable with the tire periphery, a frame, means rotatably mounting the drive spindle to the frame, means pivotally mounting the frame for swinging movement of the frame and drive spindle toward and away from the tire periphery, spring means urging the frame in a direction to maintain the drive spindle in frictional engagement with the tire periphery and urging said frame toward an extreme position when the tire is not mounted on said tire mounting means and in engagement with said drive spindle, switch means actuable to prevent operation of said cutter drive means, and means on said frame engageable with said switch means to actuate the latter when said frame is in said extreme position.

8. A tire trueing apparatus comprising a cutter, means rotatably mounting said cutter, means for drivingly rotating the cutter about its axis, a support member, a spindle secured to one end of said support member, means for mounting a tire for free rotation on said spindle about an axis parallel to said cutter axis, means pivotally mounting the other end of said support member for pivotal movement about an axis parallel to the cutter axis, adjustable means for varying the angular position of said support member about its pivotal axis so as to vary the distance between said spindle and said cutter, a drive spindle engageable with the periphery of said tire, a frame, means rotatably mounting said drive spindle to said frame, means pivotally mounting said frame for swinging movement of the frame and drive spindle toward and away from the tire periphery, spring means urging the frame in a direction to maintain said drive spindle in frictional engagement with the tire periphery, switch means actuable in the spring urged direction of said frame to prevent operation of said cutter rotating means, and means on said frame engageable with said switch means to actuate the latter when a tire is not mounted on said spindle.

9. A tire trueing apparatus comprising a cutter, means rotatably mounting the cutter, an electric motor, means connecting said motor to said cutter for rotating the latter in response to actuation of the motor, means for rotatably mounting a tire, a movable frame mounting a spindle engageable with the tire for rotating the latter, means connecting said motor to said spindle for rotating the latter, circuit breaking switch means in the path of said movable frame actuable to maintain the motor inoperative, means on said movable frame for actuating said switch, spring means to yieldably move said movable frame into actuating engagement with said switch means when a tire is not in engagement with said spindle, the pressure of a tire periphery against the spindle causing the frame to be moved out of engagement with said switch means against the action of said spring means to thereby render said motor operative.

10. A tire trueing apparatus comprising a cutter, means rotatably mounting the cutter, an electric motor, means connecting said motor to said cutter for rotating the latter in response to actuation of the motor, means for rotatably mounting a tire, drive means operable by said motor engageable by the periphery of the tire for rotating the tire, a pivoted frame mounting said drive means, circuit breaking switch means in the path of said movable frame actuable to maintain the motor inoperative, means on said pivoted frame for actuating said switch, spring means to yieldably pivot said movable frame into actuating engagement with said switch means when a tire is not in engagement with said drive means, the pressure of a tire periphery against the drive means causing the frame to be moved out of engagement with said switch means against the action of said spring means to thereby render said motor operative.

References Cited in the file of this patent

UNITED STATES PATENTS

| Number | Name | Date |
|---|---|---|
| 1,413,232 | Miolla | Apr. 18, 1922 |
| 1,510,819 | Barth | Oct. 7, 1924 |
| 1,762,810 | Brittain et al. | June 10, 1930 |
| 1,925,177 | Delf | Sept. 5, 1933 |
| 1,961,499 | Kunkel | June 5, 1934 |
| 2,017,865 | Morgan | Oct. 22, 1935 |
| 2,045,778 | Huntley et al. | June 30, 1936 |
| 2,085,393 | Rosenberger | June 29, 1937 |
| 2,148,065 | Farmer | Feb. 21, 1939 |
| 2,181,124 | Edwards et al. | Nov. 28, 1939 |
| 2,224,728 | Gullicksen | Dec. 10, 1940 |
| 2,258,378 | Callmann | Oct. 7, 1941 |
| 2,259,820 | James | Oct. 21, 1941 |
| 2,262,596 | Watkins | Nov. 11, 1941 |
| 2,276,626 | Poock et al. | Mar. 17, 1942 |
| 2,310,211 | Brostrom | Feb. 9, 1943 |
| 2,322,033 | Le Brun | June 15, 1943 |
| 2,339,597 | Barnes | Jan. 18, 1944 |
| 2,392,667 | Hawkinson | Jan. 8, 1946 |
| 2,496,013 | Myers | Jan. 31, 1950 |
| 2,508,849 | Williams | May 23, 1950 |
| 2,515,167 | Arel | July 18, 1950 |
| 2,535,281 | Glynn | Dec. 26, 1950 |
| 2,613,881 | Kottmann | Oct. 14, 1952 |
| 2,623,591 | Furnald | Dec. 30, 1952 |
| 2,651,893 | Braley | Sept. 15, 1953 |
| 2,705,999 | Leguillon et al. | Apr. 12, 1955 |
| 2,786,526 | Tobey | Mar. 26, 1957 |
| 2,805,699 | Reading | Sept. 10, 1957 |

FOREIGN PATENTS

| 129,652 | Switzerland | Jan. 4, 1928 |

UNITED STATES PATENT OFFICE
CERTIFICATE OF CORRECTION

December 22, 1959

Patent No. 2,918,116

John Russell Mooney

It is hereby certified that error appears in the printed specification of the above numbered patent requiring correction and that the said Letters Patent should read as corrected below.

Column 7, line 60, for "to he" read -- to the --; column 11, line 59, for "pass" read -- press --.

Signed and sealed this 28th day of June 1960.

(SEAL)
Attest:

KARL H. AXLINE
Attesting Officer

ROBERT C. WATSON
Commissioner of Patents